US009707991B2

(12) United States Patent
Kamimura et al.

(10) Patent No.: US 9,707,991 B2
(45) Date of Patent: Jul. 18, 2017

(54) TELESCOPIC SHAFT AND STEERING SYSTEM

(71) Applicants: JTEKT CORPORATION, Osaka-shi, Osaka (JP); KOYO MACHINE INDUSTRIES CO., LTD., Yao-shi, Osaka (JP)

(72) Inventors: Futoshi Kamimura, Okazaki (JP); Kiyoshi Iwase, Nissin (JP); Mitsuharu Ozaki, Kashiba (JP); Daiki Yano, Shiki-gun (JP); Kazuhide Honda, Okazaki (JP); Yasutaka Fukumoto, Toyota (JP); Osamu Honda, Fujiidera (JP); Naoki Fujimoto, Kashiwara (JP); Takashi Maeda, Nara (JP)

(73) Assignees: JTEKT CORPORATION, Osaka-shi (JP); KOYO MACHINE INDUSTRIES CO., LTD., Yao-shi (JP)

( * ) Notice: Subject to any disclaimer, the term of this patent is extended or adjusted under 35 U.S.C. 154(b) by 0 days.

(21) Appl. No.: 14/981,091

(22) Filed: Dec. 28, 2015

(65) Prior Publication Data

US 2016/0185378 A1   Jun. 30, 2016

(30) Foreign Application Priority Data

Dec. 25, 2014   (JP) ................. 2014-262872

(51) Int. Cl.
*B62D 1/20* (2006.01)
*B62D 1/16* (2006.01)
(Continued)

(52) U.S. Cl.
CPC ............. *B62D 1/20* (2013.01); *B62D 1/16* (2013.01); *F16C 3/035* (2013.01); *F16C 29/04* (2013.01); *F16D 3/065* (2013.01); *F16C 2326/24* (2013.01)

(58) Field of Classification Search
CPC ... B62D 1/20; B62D 1/16; F16C 3/035; F16C 29/04
See application file for complete search history.

(56) References Cited

U.S. PATENT DOCUMENTS 7,753,800 B2 * 7/2010 Tokioka ................. B62D 1/185
384/54
8,342,056 B2 * 1/2013 Tokioka .................. B62D 1/16
74/493

(Continued)

FOREIGN PATENT DOCUMENTS

| JP | 2007255546 A | * 10/2007 | ............... F16D 3/06 |
| JP | 2009-197818 A | 9/2009 | |
| JP | 2010-053943 A | 3/2010 | |

OTHER PUBLICATIONS

Translation of JP2007255546A.*
Nov. 17, 2016 Extended European Search Report Issued in European Patent Application No. 15202338.8.

*Primary Examiner* — Faye M Fleming
(74) *Attorney, Agent, or Firm* — Oliff PLC

(57) ABSTRACT

A telescopic shaft includes: an inner shaft where a pair of recessed grooves that face each other in a direction perpendicular to an axis and extend in an axial direction are formed; an outer shaft where a pair of recessed grooves that face each other in the direction perpendicular to the axis and extend in the axial direction are formed; a plurality of rolling bodies that are disposed between each of the recessed grooves and the corresponding recessed groove so as to form a line in the axial direction; a pair of stoppers; and a buffer body unit. Each of the stoppers restricts falling of a rolling body at an end portion of the corresponding line from the corresponding recessed groove of the inner shaft. The buffer body unit integrally includes a pair of buffer bodies, and a connection portion that connects the pair of buffer bodies.

4 Claims, 4 Drawing Sheets

(51) Int. Cl.
*F16C 3/035* (2006.01)
*F16C 29/04* (2006.01)
*F16D 3/06* (2006.01)

(56) References Cited

U.S. PATENT DOCUMENTS

| | | | |
|---|---|---|---|
| 9,126,623 B2* | 9/2015 | Linde | B62D 1/20 |
| 2006/0012161 A1 | 1/2006 | Yamada | |
| 2016/0131196 A1* | 5/2016 | Miyawaki | B62D 1/20 |
| | | | 464/167 |
| 2016/0185379 A1* | 6/2016 | Ozaki | B62D 1/192 |
| | | | 280/777 |

\* cited by examiner

TELESCOPIC SHAFT AND STEERING SYSTEM

INCORPORATION BY REFERENCE

The disclosure of Japanese Patent Application No. 2014-262872 filed on Dec. 25, 2014 including the specification, drawings and abstract is incorporated herein by reference in its entirety.

BACKGROUND OF THE INVENTION

1. Field of the Invention

The invention relates to a telescopic shaft and a steering system.

2. Description of Related Art

Japanese Patent Application Publication No. 2010-053943 proposes a telescopic shaft having a structure in which each of coil springs is disposed between a washer disposed at a distal end portion of an inner shaft, and a ball disposed in each of recessed grooves. In a telescopic shaft of Japanese Patent Application Publication No. 2009-197818, a movable washer, a spring plate, and a fixed washer are sequentially externally-fitted to a small-diameter shaft portion at a shaft end of a male shaft. A shaft end of the small-diameter shaft portion is subjected to crimping, and the crimped portion locks the fixed washer. The spring plate is received by the fixed washer, and urges the movable washer. The movable washer and the spring plate constitute a buffer element that buffers collision with a ball.

In JP 2010-053943 A, it is necessary to separately attach each of the plurality of coil springs that are independent of each other to the corresponding recessed groove such that the coil springs do not fall from the recessed grooves when the telescopic shaft is assembled. Thus, ease of assembly is poor. In JP 2009-197818 A, it is necessary to separately attach a plurality of components (the spring plate and the movable washer) as the buffer element when the telescopic shaft is assembled. Thus, ease of assembly is poor.

SUMMARY OF THE INVENTION

The invention provides a telescopic shaft having high ease of assembly, and a steering system including the telescopic shaft.

A first aspect of the invention is a telescopic shaft including: an inner shaft where a pair of recessed grooves that extend in an axial direction and face each other in a direction perpendicular to an axis are formed in an outer peripheral surface; an outer shaft where a pair of recessed grooves that extend in the axial direction and face each other in the direction perpendicular to the axis are formed in an inner peripheral surface; a plurality of rolling bodies that are disposed between each of the recessed grooves of the inner shaft and the corresponding recessed groove of the outer shaft so as to form a line in the axial direction; a pair of stoppers, each of which restricts falling of a rolling body at an end portion of the corresponding line from the corresponding recessed groove of the inner shaft at a stroke end of the inner shaft with respect to the outer shaft; and a buffer body unit integrally including a pair of buffer bodies, each of which is interposed between each of the pair of stoppers and the rolling body at the end portion of the corresponding line, and a connection portion that connects the pair of buffer bodies. In accordance with the present aspect, since the pair of buffer bodies can be collectively attached as the integrated buffer body unit to the inner shaft during assembly, ease of assembly is improved.

The buffer body unit may include an engagement portion that engages with the inner shaft so as to tentatively hold the buffer body unit on the inner shaft. In accordance with the configuration, the buffer body unit can be tentatively held on the inner shaft before the buffer body unit is fixed to the inner shaft during assembly. Thus, the ease of assembly is improved.

The connection portion may face a shaft end surface of the inner shaft, and the engagement portion may be extended from the connection portion. In accordance with the configuration, the buffer body unit can be tentatively held on the inner shaft from the shaft end surface side during assembly. Thus, the ease of assembly is improved.

The telescopic shaft may further include a pin that is inserted and held in an axis-perpendicular-direction hole of the inner shaft, wherein the pin may function as a fastening member that fastens the buffer body unit to the inner shaft in a state in which a pair of end portions of the pin are inserted through pin insertion holes of the pair of buffer bodies, respectively, and the pair of end portions of the pin may constitute the pair of stoppers. In accordance with the configuration, by attaching the pin as the fastening member to the inner shaft so as to fasten the buffer body unit to the inner shaft, attachment of the pair of stoppers to the inner shaft is completed. Thus, the ease of assembly is improved.

A second aspect of the invention is a steering system including an intermediate shaft composed of the telescopic shaft. In accordance with the second aspect, it is possible to provide the steering system having high ease of assembly.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
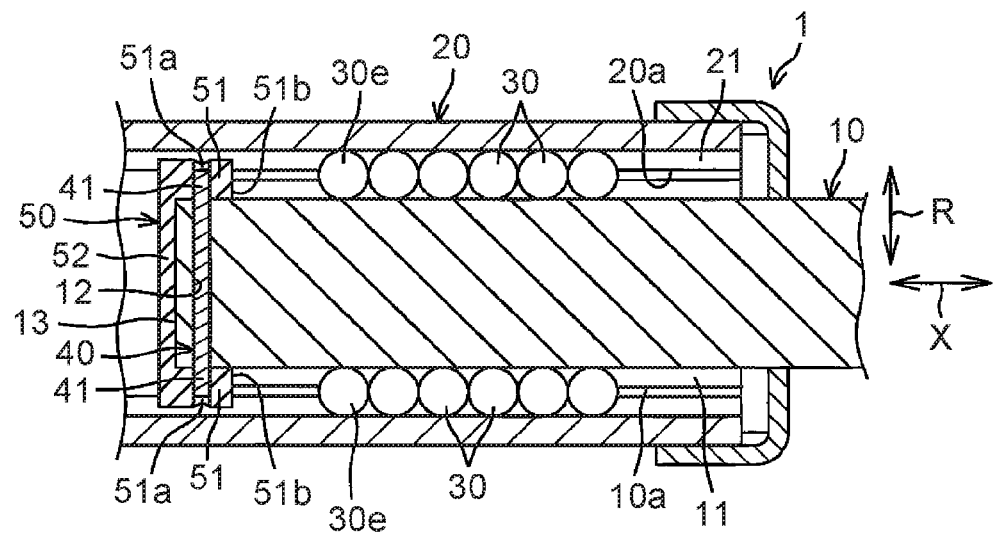
FIG. 1 is a sectional view of a main portion of a telescopic shaft according to a first embodiment of the invention.

Embodiments of the invention will be described by reference to the accompanying drawings. FIG. 1 is a sectional view of a main portion of a telescopic shaft according to a first embodiment of the invention. As shown in FIG. 1, a telescopic shaft 1 includes an inner shaft 10 where a recessed groove 11 that extends in an axial direction X is formed in an outer peripheral surface 10a, and an outer shaft 20 where a recessed groove 21 that extends in the axial direction X is formed in an inner peripheral surface 20a. The telescopic shaft 1 also includes a plurality of rolling bodies 30 that are disposed between the recessed grooves 11, 21 of the inner shaft 10 and the outer shaft 20, and form a line in the axial direction X. For example, the rolling bodies 30 are metal balls.

Figure 2:
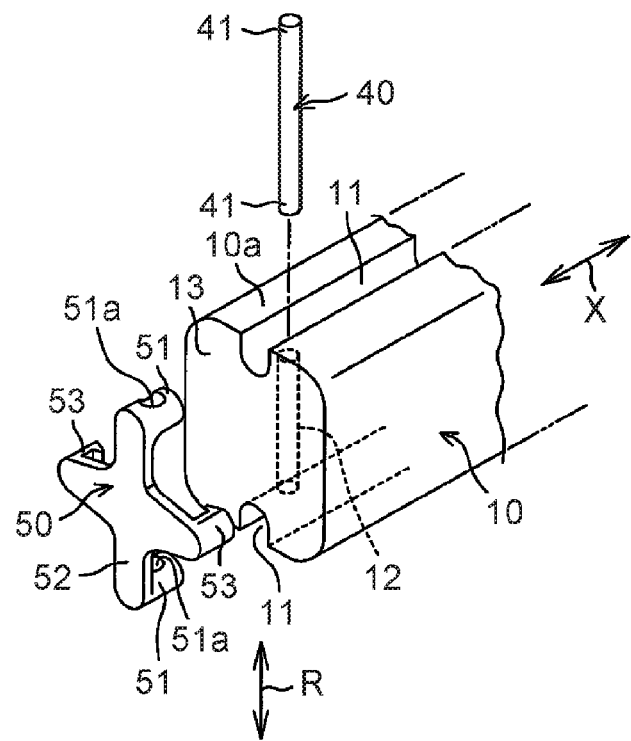
FIG. 2 is an exploded perspective view of an inner shaft, a pin having a stopper function, and a buffer body unit.

A pair of recessed grooves 11 facing each other in a direction R perpendicular to an axis are provided in the inner shaft 10. A pair of recessed grooves 21 facing each other in the axis-perpendicular direction R are provided in the outer shaft 20. The plurality of rolling bodies 30 are interposed between one of the recessed grooves 11 of the inner shaft 10 and the corresponding recessed groove 21 of the outer shaft 20 so as to form a line, and the plurality of rolling bodies 30 are also interposed between the other of the recessed grooves 11 of the inner shaft 10 and the corresponding recessed groove 21 of the outer shaft 20 so as to form a line. As shown in FIG. 2 that is an exploded perspective view, the inner shaft 10 includes an axis-perpendicular-direction hole 12 that extends in the axis-perpendicular direction R such that opposite ends of the axis-perpendicular-direction hole 12 open in bottoms of the pair of recessed grooves 11. As shown in FIG. 1, a pin 40 is inserted and held in the axis-perpendicular-direction hole 12. To be more specific, the pin 40 is press-fitted into the axis-perpendicular-direction hole 12. A pair of end portions of the pin 40 project into the pair of recessed grooves 11, respectively, from the axis-perpendicular-direction hole 12 to constitute a pair of stoppers 41.

Figure 4:
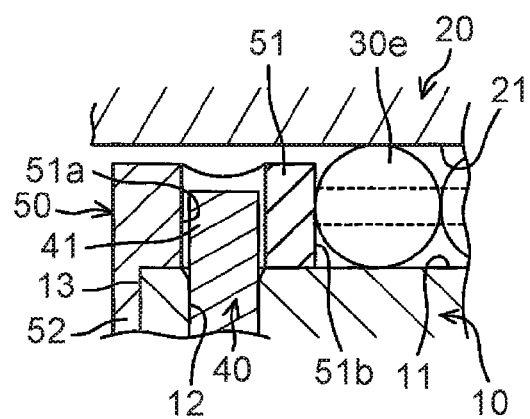
FIG. 4 is an enlarged sectional view of a main portion of the telescopic shaft during buffering.

When the inner shaft 10 reaches a stroke end on an extended side (a right side in FIG. 1) with respect to the outer shaft 20 in FIG. 1, each of the stoppers 41 restricts falling of a rolling body 30e at an end portion of the corresponding line from the corresponding recessed groove 11 of the inner shaft 10 as shown in FIG. 4. The stopper 41 receives the rolling body 30e at the end portion of the line while absorbing an impact via a buffer body 51. To be more specific, the telescopic shaft 1 includes a buffer body unit 50 including a pair of buffer bodies 51 as shown in FIG. 2. The buffer body unit 50 is a unit that includes the pair of buffer bodies 51, a connection portion 52 that connects the pair of buffer bodies 51, and a pair of engagement arms 53, as an engagement portion, that extend from an intermediate portion of the connection portion 52 to opposite sides from each other in a direction different from the connection portion 52.

The buffer body unit 50 is integrally formed of a single material. The buffer body unit 50 is formed by an elastic body. The buffer body unit 50 is formed of resin, rubber, or metal. As shown in FIG. 1, each of the buffer bodies 51 is interposed between each of the stoppers 41 and the rolling body 30e at the end portion of the corresponding line. The connection portion 52 is received facing a shaft end surface 13 of the inner shaft 10. The connection portion 52 is elastically deformable such as bending deformation.

Each of the buffer bodies 51 is a cylindrical member that extends in the axial direction X from each end of the connection portion 52. Each of the buffer bodies 51 is disposed between the corresponding recessed grooves 11, 21. Each of the buffer bodies 51 has a pin insertion hole 51a through which the corresponding end portion (the stopper 41) of the pin 40 is inserted. Each of the buffer bodies 51 also includes an end surface 51b facing the rolling body 30e at the end portion of the corresponding line. The end surface 51b of each of the buffer bodies 51 abuts against the rolling body 30e at the end portion of the corresponding line at the stroke end on the extended side of the inner shaft 10 as shown in FIG. 4.

Figure 3:
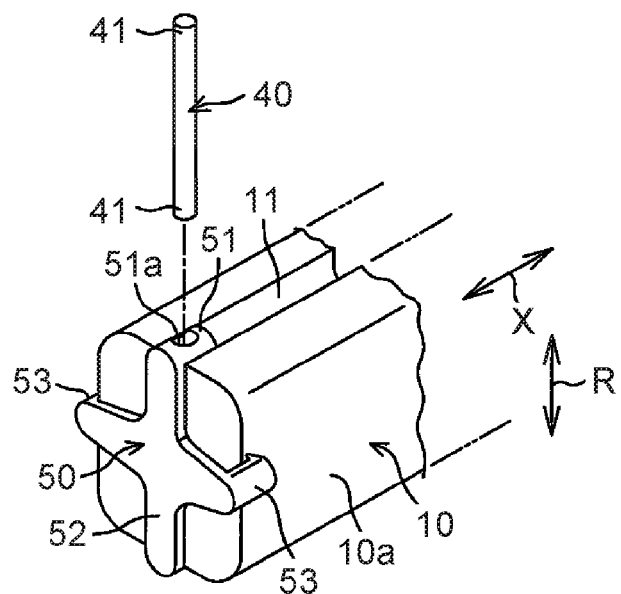
FIG. 3 is an exploded perspective view of the inner shaft on which the buffer body unit is tentatively held, and the pin.

Each of the pair of engagement arms 53 is a hook-like body having a substantially L shape. The pair of engagement arms 53 elastically clamp axis-perpendicular-direction facing portions of the outer peripheral surface 10a of the inner shaft 10 by a restoring force of the engagement arms 53 in a state in which the engagement arms 53 are elastically widened. As shown in FIG. 3, the pair of engagement arms 53 elastically engages with the outer peripheral surface 10a of the inner shaft 10 so as to tentatively hold the buffer body unit 50 on the inner shaft 10 in a stage before the pin 40 is attached to the inner shaft 10 when the telescopic shaft 1 is assembled.

In a state in which the buffer body unit 50 is tentatively held on the inner shaft 10, the pin 40 is press-fitted into the axis-perpendicular-direction hole 12 (see FIG. 2) of the inner shaft 10 so as to be inserted through the pin insertion holes 51a of the pair of buffer bodies 51. The pin 40 functions as a fastening member that fastens the buffer body unit 50 to the inner shaft 10 in a state in which the pair of end portions (the stoppers 41) of the pin 40 are inserted through the pin insertion holes 51a of the pair of buffer bodies 51, respectively, as shown in FIG. 1.

The pair of buffer bodies 51, the connection portion 52 that connects the pair of buffer bodies 51 and faces the shaft end surface 13 of the inner shaft 10, and the pin 40 that is parallel to the connection portion 52 form a box shape (a quadrangular annular shape), and are fastened to the inner shaft 10. In accordance with the present embodiment, since the pair of buffer bodies 51 can be collectively attached as the integrated buffer body unit 50 to the inner shaft during assembly as shown in FIGS. 2, 3, ease of assembly is improved.

Also, the buffer body unit 50 can be tentatively held on the inner shaft 10 via the engagement arms 53 (the engagement portion) as shown in FIG. 3 before the buffer body unit 50 is fixed to the inner shaft 10 during assembly. Thus, the ease of assembly is improved. The connection portion 52 of the buffer body unit 50 faces the shaft end surface 13 of the inner shaft 10, and the engagement arms 53 are extended from the connection portion 52. Therefore, the buffer body unit 50 can be tentatively held on the inner shaft 10 from the shaft end surface 13-side during assembly. Thus, the ease of assembly is improved.

By attaching the pin 40 as the fastening member to the inner shaft 10 so as to fasten the buffer body unit 50 to the inner shaft 10, attachment of the pair of stoppers 41 to the inner shaft 10 is completed. Thus, the ease of assembly is improved. In the buffer body unit 50, each of the pair of buffer bodies 51 buffers collision energy received by the other buffer body 51 through the connection portion 52. Accordingly, a buffer effect can be increased.

If the pin directly receives the rolling body at the end portion of the line at the stroke end on the extended side of the inner shaft (that is, in a fully-extended state of the telescopic shaft), rolling of the rolling body is restricted by the pin. Thus, the telescopic shaft may be locked in the fully-extended state, or an extension and contraction load of the telescopic shaft may be increased. In contrast, in the present embodiment, since the buffer body 51 is interposed between the stopper 41 and the rolling body 30e at the end portion of the line, it is possible to suppress the occurrence of the locking and the increase in the extension and contraction load when the telescopic shaft is fully extended.

Figure 5:
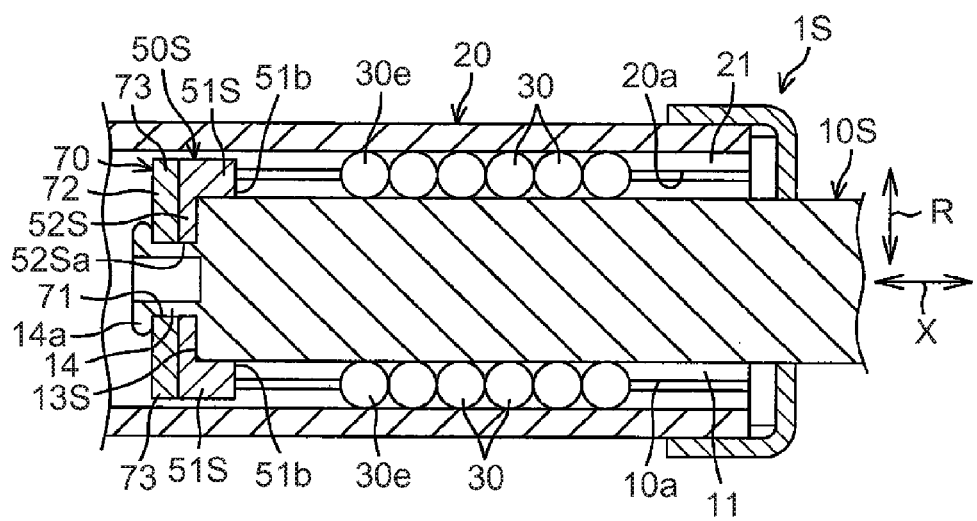
FIG. 5 is a sectional view of a main portion of a telescopic shaft according to a second embodiment of the invention.
Figure 6:
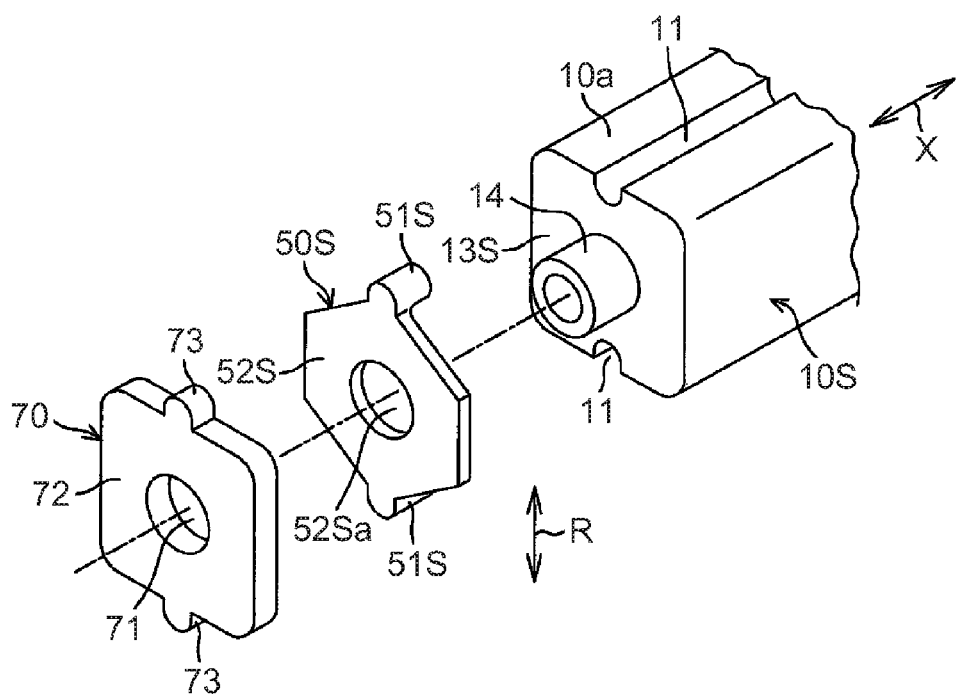
FIG. 6 is an exploded perspective view of an inner shaft, a buffer body unit, and a fastening member having a stopper function in the second embodiment.

FIG. 5 is a sectional view of a main portion of a telescopic shaft 1S according to a second embodiment of the invention. FIG. 6 is an exploded perspective view of an inner shaft 10S, a buffer body unit 50S, and a fastening member 70 having a stopper function.

As shown in FIGS. 5, 6, a tubular projection 14 that projects in the axial direction X is formed on a shaft end surface 13S of the inner shaft 10S. The buffer body unit 50S and the fastening member 70 are sequentially fitted to an outer periphery of the tubular projection 14. The buffer body unit 50S includes a pair of substantially-cylindrical buffer bodies 51S that are accommodated in the pair of recessed grooves 11 of the inner shaft 10S, respectively, and a plate-shaped connection portion 52S that connects the pair of buffer bodies 51S. The connection portion 52S has a fitting hole 52Sa that is fitted to the outer periphery of the tubular projection 14.

The fastening member 70 includes a body portion 72 having, for example, a substantially rectangular shape, and a pair of stoppers 73 each composed of a projection. The body portion 72 has a fitting hole 71 that is fitted to the outer periphery of the tubular projection 14. The pair of stoppers 73 is provided on a pair of facing end portions of the body portion 72, respectively. Each of the stoppers 73 receives the rolling body 30e at the end portion of the corresponding line via the corresponding buffer body 51S. As shown in FIG. 5, a portion of an end edge of the tubular projection 14 is widened outward in the axis-perpendicular direction to form a crimped portion 14a that is crimped onto the body portion 72 of the fastening member 70. In the above state, the fastening member 70 presses the connection portion 52S of the buffer body unit 50S to the shaft end surface 13S of the inner shaft 10S. Accordingly, the fastening member 70 functions to fasten the buffer body unit 50S to the inner shaft 10S.

The same constituent elements as the constituent elements of the first embodiment in FIGS. 1, 2 out of constituent elements of the second embodiment in FIGS. 5, 6 are assigned the same reference numerals as the reference numerals of the constituent elements of the first embodiment in FIGS. 1, 2. In accordance with the second embodiment, since the pair of buffer bodies 51S can be collectively attached as the integrated buffer body unit 50S to the inner shaft 10S during assembly, the ease of assembly is improved. By attaching the fastening member 70 to the inner shaft 10S so as to fasten the buffer body unit 50S to the inner shaft 10S, attachment of the pair of stoppers 73 to the inner shaft 10S is completed. Thus, the ease of assembly is improved.

Figure 7:
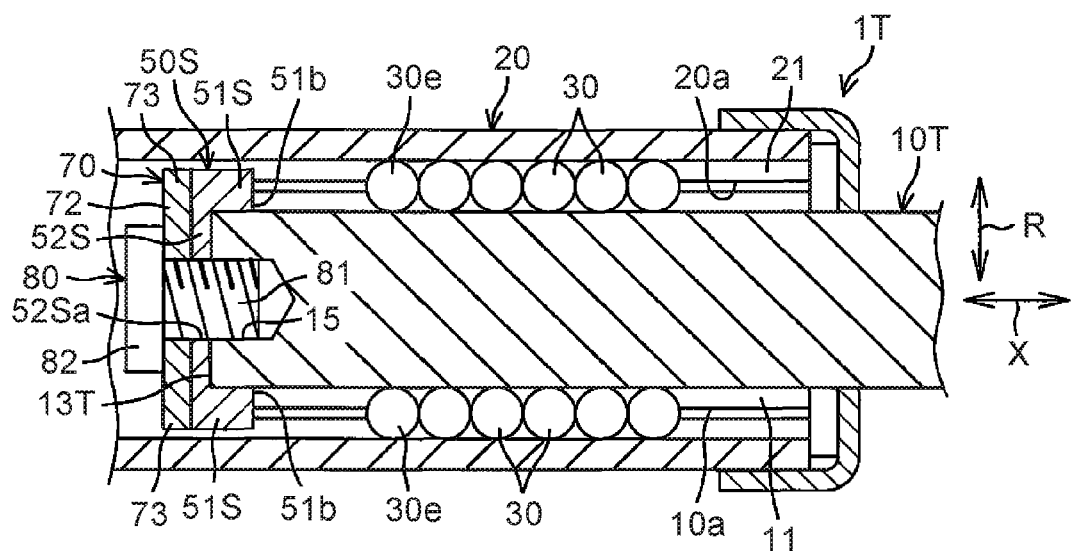
FIG. 7 is a sectional view of a main portion of a telescopic shaft according to a third embodiment of the invention.

FIG. 7 shows a telescopic shaft 1T according to a third embodiment of the invention. The third embodiment in FIG. 7 differs from the second embodiment in FIG. 5 mainly in the following point. That is, a threaded hole 15 is formed in a shaft end surface 13T of an inner shaft 10T.

A threaded shaft 81 of a bolt 80 as a fastening member is inserted through the fitting hole 71 of the fastening member 70 and the fitting hole 52Sa of the connection portion 52S of the buffer body unit 50S to be screwed into the threaded hole 15. The body portion 72 of the fastening member 70 and the connection portion 52S of the buffer body unit 50S are clamped between a head portion 82 of the bolt 80 and the shaft end surface 13T of the inner shaft 10T. Accordingly, the buffer body unit 50S is fastened to the inner shaft 10T.

The same constituent elements as the constituent elements of the second embodiment in FIG. 5 out of constituent elements of the third embodiment in FIG. 7 are assigned the same reference numerals as the reference numerals of the constituent elements of the second embodiment in FIG. 5. In accordance with the third embodiment, since the pair of buffer bodies 51S can be collectively attached as the integrated buffer body unit 50S to the inner shaft 10T during assembly, the ease of assembly is improved. In the third embodiment, the fastening member 70 may be formed integrally with the head portion 82 of the bolt 80. In this case, a simplified structure can be achieved, and the ease of assembly can be improved.

Figure 8:
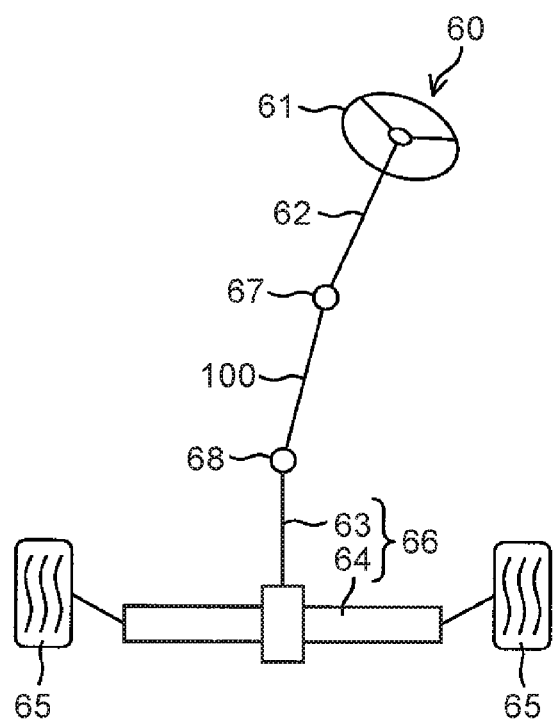
FIG. 8 is a schematic view of a steering system according to a fourth embodiment of the invention in which the telescopic shaft is applied to an intermediate shaft of the steering system.

The telescopic shaft of each of the first to third embodiments may be applied to an intermediate shaft 100 of a steering system 60 as shown in FIG. 8.

To be more specific, the steering system 60 includes a steering shaft 62 where a steering wheel 61 is connected to one end, a steering mechanism 66 that is composed of a rack-and-pinion mechanism including a pinion shaft 63 and a rack shaft 64, and steers steered wheels 65, and the intermediate shaft 100 that is interposed between the steering shaft 62 and the pinion shaft 63 to transmit steering torque.

One end of the intermediate shaft 100 is connected to the steering shaft 62 via a universal joint 67. The other end of the intermediate shaft 100 is connected to the pinion shaft 63 via a universal joint 68. One of the inner shaft and the outer shaft of the telescopic shaft constituting the intermediate shaft 100 is positioned on an upper side, and the other is positioned on a lower side. In accordance with the present embodiment, noise caused by striking sound regarding the intermediate shaft 100 can be reduced.

The invention is not limited to the above embodiments. For example, male threads provided on the outer periphery of the tubular projection, and female threads formed on an inner periphery of the fitting hole 71 of the body portion 72 of the fastening member 70 may be screwed together without performing the crimping in the second embodiment in FIG. 5. Also, in the second and third embodiments, the pair of engagement arms (the engagement portion) for tentatively holding the buffer body unit 50S may be extended from the connection portion 52S of the buffer body unit 50S similarly to the first embodiment in FIG. 2.

What is claimed is:
1. A telescopic shaft comprising:
an inner shaft where a pair of recessed grooves that extend in an axial direction and face each other in a direction perpendicular to an axis are formed in an outer peripheral surface;
an outer shaft where a pair of recessed grooves that extend in the axial direction and face each other in the direction perpendicular to the axis are formed in an inner peripheral surface;
a plurality of rolling bodies that are disposed between each of the recessed grooves of the inner shaft and the corresponding recessed groove of the outer shaft so as to form a line in the axial direction;
a pair of stoppers, each of which restricts falling of a rolling body at an end portion of the corresponding line from the corresponding recessed groove of the inner shaft at a stroke end of the inner shaft with respect to the outer shaft;
a buffer body unit integrally including a pair of buffer bodies, each of which is interposed between each of the pair of stoppers and the rolling body at the end portion of the corresponding line, and a connection portion that connects the pair of buffer bodies; and
a pin that is inserted and held in a axis-perpendicular-direction hole of the inner shaft, wherein the pin functions as a fastening member that fastens the buffer body unit to the inner shaft in a state in which a pair of end portions of the pin are inserted through pin insertion holes of the pair of buffer bodies, respectively, and the pair of end portions of the pin constitute the pair of stoppers.

2. The telescopic shaft according to claim 1, wherein the buffer body unit includes an engagement portion that engages with the inner shaft so as to tentatively hold the buffer body unit on the inner shaft.

3. The telescopic shaft according to claim 2, wherein the connection portion faces a shaft end surface of the inner shaft, and the engagement portion is extended from the connection portion.

4. A steering system comprising an intermediate shaft composed of a telescopic shaft according to claim 1.

* * * * *